(12) United States Patent
Cha et al.

(10) Patent No.: US 12,258,885 B2
(45) Date of Patent: Mar. 25, 2025

(54) COMBINED POWER GENERATION SYSTEM AND OPERATION CONTROL METHOD THEREOF

(71) Applicants: DOOSAN ENERBILITY CO., LTD., Changwon (KR); SEOUL NATIONAL UNIVERSITY R&DB FOUNDATION, Seoul (KR)

(72) Inventors: Song Hun Cha, Osan (KR); Do Hoon Kim, Seoul (KR); Se Hyeok Lee, Seoul (KR); Min Soo Kim, Seoul (KR); Hong Geun Ha, Yongin (KR)

(73) Assignees: DOOSAN ENERBILITY CO., LTD., Changwon (KR); SEOUL NATIONAL UNIVERSITY R&DBFOUNDATION, Seoul (KR)

( * ) Notice: Subject to any disclaimer, the term of this patent is extended or adjusted under 35 U.S.C. 154(b) by 0 days.

(21) Appl. No.: 18/477,427

(22) Filed: Sep. 28, 2023

(65) Prior Publication Data
US 2024/0175394 A1 May 30, 2024

(30) Foreign Application Priority Data
Nov. 24, 2022 (KR) .......................... 10-2022-0159702

(51) Int. Cl.
*F01K 23/10* (2006.01)
*F02C 7/18* (2006.01)
*F02C 9/18* (2006.01)

(52) U.S. Cl.
CPC .............. *F01K 23/106* (2013.01); *F02C 7/18* (2013.01); *F02C 9/18* (2013.01)

(58) Field of Classification Search
CPC ..................................................... F01K 23/106
See application file for complete search history.

(56) References Cited

U.S. PATENT DOCUMENTS

| 6,145,295 A | 11/2000 | Donovan et al. |
| 6,412,285 B1 | 7/2002 | Ranasinghe |
| 2002/0007624 A1 | 1/2002 | Mittricker |

(Continued)

FOREIGN PATENT DOCUMENTS

| CA | 2164648 A1 | 5/1997 |
| CN | 207178041 | 4/2018 |

(Continued)

OTHER PUBLICATIONS

EP EESR, dated Feb. 27, 2024.

*Primary Examiner* — Katheryn A Malatek
(74) *Attorney, Agent, or Firm* — Harvest IP Law, LLP (57) ABSTRACT

A combined power generation system includes a gas turbine including a compressor configured to compress air, a combustor configured to mix the compressed air from the compressor and fuel and combust a mixture of the compressed air and fuel, and a turbine section in which rotational power is obtained by combustion gases generated by the combustor. The system also includes a heat recovery steam generator (HRSG) in which steam is generated by heat of exhaust gases from the gas turbine, and a steam turbine driven by the steam generated by the HRSG, wherein the HRSG includes a plurality of heat exchangers provided to cool the compressed air by heat exchange between the compressed air and the exhaust gases.

20 Claims, 4 Drawing Sheets

(56) References Cited

U.S. PATENT DOCUMENTS

2019/0323384 A1* 10/2019 Uechi .................... F01K 7/22
2020/0165971 A1   5/2020 Uechi
2020/0332681 A1  10/2020 Uechi
2022/0325639 A1  10/2022 Drouvot

FOREIGN PATENT DOCUMENTS

| JP | 1994-212910 A | 8/1994 |
| JP | 11173111 A | 6/1999 |
| JP | 2002147205 A | 5/2002 |
| JP | 2002213208 A | 7/2002 |
| JP | 2003206750 A | 7/2003 |
| JP | 2005344528 A | 12/2005 |
| JP | 2007016791 A | 1/2007 |
| JP | 2015-514179 A | 5/2015 |
| JP | 2019-173723 A | 10/2019 |
| JP | 2022023871 A | 2/2022 |
| KR | 2001-0040251 A | 5/2001 |
| KR | 10-2017-0036791 A | 4/2017 |
| KR | 10-2018-0016494 A | 2/2018 |
| KR | 10-2022-0136290 A | 10/2022 |

\* cited by examiner

COMBINED POWER GENERATION SYSTEM AND OPERATION CONTROL METHOD THEREOF

CROSS REFERENCE TO RELATED APPLICATION

The present application claims priority to Korean Patent Application No. 10-2022-0159702, filed on Nov. 24, 2022, the entire contents of which are incorporated herein for all purposes by this reference.

BACKGROUND OF THE INVENTION

1. Field of the Invention

The present disclosure relates to a combined power generation system and an operation control method thereof and, more particularly, to a combined power generation system in which a heat recovery steam generator (HRSG) is provided with a heat exchanger for cooling compressed air with exhaust gases from a gas turbine, and an operation control method thereof.

2. Description of the Background Art

A combined power generation system is a power generation system that combines a gas turbine and a steam turbine to achieve high efficiency by guiding high-temperature exhaust gas from the gas turbine to a heat recovery steam generator (HRSG) and generating steam using thermal energy retained in the exhaust gas. This steam enables power generation by the steam turbine and can be combined with the power generated by the gas turbine to improve higher thermal efficiency leveraging the thermal energy retained in the exhaust gas. This improvement is in contrast to the autonomous power production solely through the gas turbine.

A gas turbine is a power engine that mixes compressed air compressed by a compressor and fuel, burns an air-fuel mixture, and rotates a turbine with high-temperature combustion gas. Gas turbines are used to drive generators, aircrafts, ships, trains, and the like.

A combustor and a turbine section of a gas turbine are heated by combustion gases and need to be cooled, and compressed air from a compressor is used to cool the combustor or turbine section. However, the compressed air for cooling is also heated during the compression process and needs to be cooled by a refrigerator before being supplied to a heat source.

The refrigerator cools the compressed air by performing heat exchange between the feedwater supplied from the HRSG and the compressed air. However, when the compressed air for cooling does not undergo sufficient cooling within the refrigerator, there may be a problem that the gas turbine is overheated.

Traditionally, compressed air for turbine cooling is cooled by a separate external heat exchanger such as a kettle boiler. However, the use of an external heat exchanger requires piping between the HRSG and the heat exchanger, requires an additional construction site, and cannot utilize water during a sub cycle as a cooling source when the turbine section is started.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a combined power generation system in which a plurality of heat exchangers is provided inside a heat recovery steam generator (HRSG) so that exhaust gases are utilized as a cooling source to shorten startup time and there is no need to provide a separate construction site for a cooling system, and an operation control method thereof.

In an aspect of the present disclosure, there is provided a combined power generation system including: a gas turbine including a compressor configured to compress air, a combustor configured to mix the compressed air from the compressor and fuel and combust a mixture of the compressed air and fuel, and a turbine section configured to rotate a turbine with combustion gases generated by the combustor and discharge exhaust gases; a heat recovery steam generator (HRSG) in which steam is generated by heat of the exhaust gases from the gas turbine; and a steam turbine driven by the steam generated by the HRSG, wherein the HRSG includes a plurality of heat exchangers provided to cool the compressed air by performing heat exchange between the compressed air and the exhaust gases.

In the combined power generation system, the plurality of heat exchangers supplies cooled compressed air to the turbine section.

The plurality of heat exchangers may include: a medium-pressure heat exchanger disposed upstream of a medium-pressure evaporator; and a low-pressure heat exchanger disposed upstream of a low-pressure evaporator to re-cool the compressed air having been cooled by the medium-pressure heat exchanger.

The combined power generation system may further include: a compressed air flow path that flows the compressed air from the compressor to the plurality of heat exchangers; a cooling air flow path that flows the cooled compressed air from the plurality of heat exchangers to the turbine section; a bypass flow path that flows the compressed air from the compressed air flow path to the cooling air flow path; a main valve installed in the compressed air flow path; and a bypass valve installed in the bypass flow path.

The combined power generation system may further include a plurality of temperature sensors installed in the cooling air flow path to measure the temperature of the cooled compressed air entering the turbine section.

The plurality of temperature sensors may include a first temperature sensor installed near an inlet of the turbine section in the cooling air flow path; and a second temperature sensor installed at a point in the cooling air flow path before the cooling air flow path is joined by the bypass flow path.

The HRSG may sequentially include a high-pressure superheater, a second medium-pressure superheater, a high-pressure evaporator disposed below a high-pressure drum, a high-pressure economizer, a first medium-pressure superheater, a medium-pressure evaporator disposed below a medium-pressure drum, a second low-pressure superheater, a medium-pressure economizer, a first low-pressure superheater, a low-pressure evaporator disposed below a low-pressure drum, and a low-pressure economizer, according to a flow direction of the exhaust gases, wherein the medium-pressure heat exchanger is disposed between the first medium-pressure superheater and the medium-pressure evaporator, and the low-pressure heat exchanger is disposed between the first low-pressure superheater and the low-pressure evaporator according to a flow direction of the exhaust gases.

The combined power generation system may further include a controller configured to regulate opening degrees of the main valve and the bypass valve, wherein the controller is configured to increase the opening degree of the bypass valve when the measured temperature of the cooled compressed air by the temperature sensor is lower than a target value, and decrease the opening degree of the bypass valve when the measured temperature of the cooled compressed air by the temperature sensor is higher than the target value.

The combined power generation system may further include a controller configured to regulate opening degrees of the main valve and the bypass valve, wherein the controller is configured to regulate the opening degree of the main valve when the temperature control by the bypass valve fails, and when the temperature control by the bypass valve does not fail, increase the opening degree of the bypass valve when the measured temperature of the cooled compressed air by the temperature sensor is less than the target value, and decrease the opening degree of the bypass valve when the measured temperature of the cooled compressed air by the temperature sensor is greater than the target value.

In a combined power generation system according to another embodiment of the present disclosure, the plurality of heat exchangers may include a high-pressure heat exchanger disposed downstream of a high-pressure evaporator, a medium-pressure heat exchanger disposed upstream of a medium-pressure evaporator to re-cool the compressed air that has been cooled by the high-pressure heat exchanger, and a low-pressure heat exchanger disposed upstream of a low-pressure evaporator to re-cool the compressed air having been cooled by the medium-pressure heat exchanger.

The combined power generation system may further include: a compressed air flow path from the compressor to the plurality of heat exchangers; a cooling air flow path from the plurality of heat exchangers to the turbine section; a bypass flow path from the compressed air flow path to the cooling air flow path; a main valve installed in the compressed air flow path; and a bypass valve installed in the bypass flow path.

The combined power generation system may further include a plurality of temperature sensors installed in the cooling air flow path to measure the temperature of the cooled compressed air entering the turbine section.

The plurality of temperature sensors may include a first temperature sensor installed near an inlet of the turbine section in the cooling air flow path; and a second temperature sensor installed at a point in the cooling air flow path before the cooling air flow path joins the bypass flow path.

The HRSG may sequentially include a high-pressure superheater, a second medium-pressure superheater, a high-pressure evaporator disposed below a high-pressure drum, a high-pressure economizer, a first medium-pressure superheater, a medium-pressure evaporator disposed below a medium-pressure drum, a second low-pressure superheater, a medium-pressure economizer, a first low-pressure superheater, a low-pressure evaporator disposed below a low-pressure drum, and a low-pressure economizer, according to a flow direction of the exhaust gases, wherein the high-pressure heat exchanger is disposed between the high-pressure evaporator and the high-pressure economizer, the medium-pressure heat exchanger is disposed between the first medium-pressure superheater and the medium-pressure evaporator, and the low-pressure heat exchanger is disposed between the first low-pressure superheater and the low-pressure evaporator according to a flow direction of the exhaust gases.

In another aspect of the present disclosure, there is provided an operation control method of a combined power generation system including: a gas turbine including a compressor, a combustor, and a turbine section; a heat recovery steam generator (HRSG); a steam turbine, and a plurality of heat exchangers provided in the HRSG to cool compressed air by heat exchange between the compressed air and exhaust gases, the method including: determining whether the temperature measured by a temperature sensor installed in a cooling air flow path connecting, and flowing the cooled compressed air, from the heat exchangers to the turbine section is within a target range; when the measured temperature is not within the target range and is lower than a target value, increasing an opening degree of a bypass valve installed in a bypass flow path connecting, and flowing the compressed air, from a compressed air flow path to the cooling air flow path; when the measured temperature is not within the target range and is higher than the target value, decreasing the opening degree of the bypass valve; and, when the measured temperature is within the target range, completing the adjustment of the opening degree of the bypass valve.

The compressed air flow path may connect, and flow the compressed air, from the compressor to the plurality of heat exchangers and the cooling air flow path may connect, and flow the cooled compressed air, from the heat exchangers to the turbine section.

The plurality of heat exchangers may include: a medium-pressure heat exchanger disposed upstream of a medium-pressure evaporator; and a low-pressure heat exchanger disposed upstream of a low-pressure evaporator to re-cool the compressed air having been cooled by the medium-pressure heat exchanger.

The plurality of heat exchangers may further include a high-pressure heat exchanger disposed downstream of a high-pressure evaporator.

In a further aspect of the present disclosure, there is provided an operation control method of a combined power generation system including: a gas turbine including a compressor, a combustor, and a turbine section; a heat recovery steam generator (HRSG); a steam turbine, and a plurality of heat exchangers provided in the HRSG to cool compressed air by performing heat exchange between the compressed air and exhaust gases and supply cooled compressed air, the method including: determining whether the temperature measured by a temperature sensor installed in a cooling air flow path connecting, and flowing the cooled compressed air, from the heat exchangers to the turbine section is within a target range; determining whether temperature control by a bypass valve installed in a bypass flow path connecting, and flowing the compressed air, from a compressed air flow path to the cooling air flow path has failed, the compressed air flow path connecting, and flowing the compressed air, from the compressor to the plurality of heat exchangers; when the temperature control by the bypass valve is determined to fail, adjusting an opening degree of a main valve installed in the compressed air flow path; when the temperature control by the bypass valve is determined to not fail, determining whether the measured temperature is lower than a target value; when the measured temperature is lower than the target value, increasing an opening degree of the bypass valve installed in the bypass flow path; when the measured temperature is higher than the target value, decreasing the opening degree of the bypass valve; and, when the measured temperature is within the target range, completing the adjustment of the opening degree of the bypass valve.

The plurality of heat exchangers may include: a medium-pressure heat exchanger disposed upstream of a medium-pressure evaporator; and a low-pressure heat exchanger disposed upstream of a low-pressure evaporator to re-cool the compressed air having been cooled by the medium-pressure heat exchanger.

The plurality of heat exchangers may further include a high-pressure heat exchanger disposed downstream of a high-pressure evaporator.

According to the combined power generation system and the operation control method thereof, the plurality of heat exchangers is provided inside the HRSG so that exhaust gases are utilized as a cooling source to shorten startup time and there is no need to provide a separate construction site for a cooling system.

DETAILED DESCRIPTION OF THE INVENTION

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Figure 1:
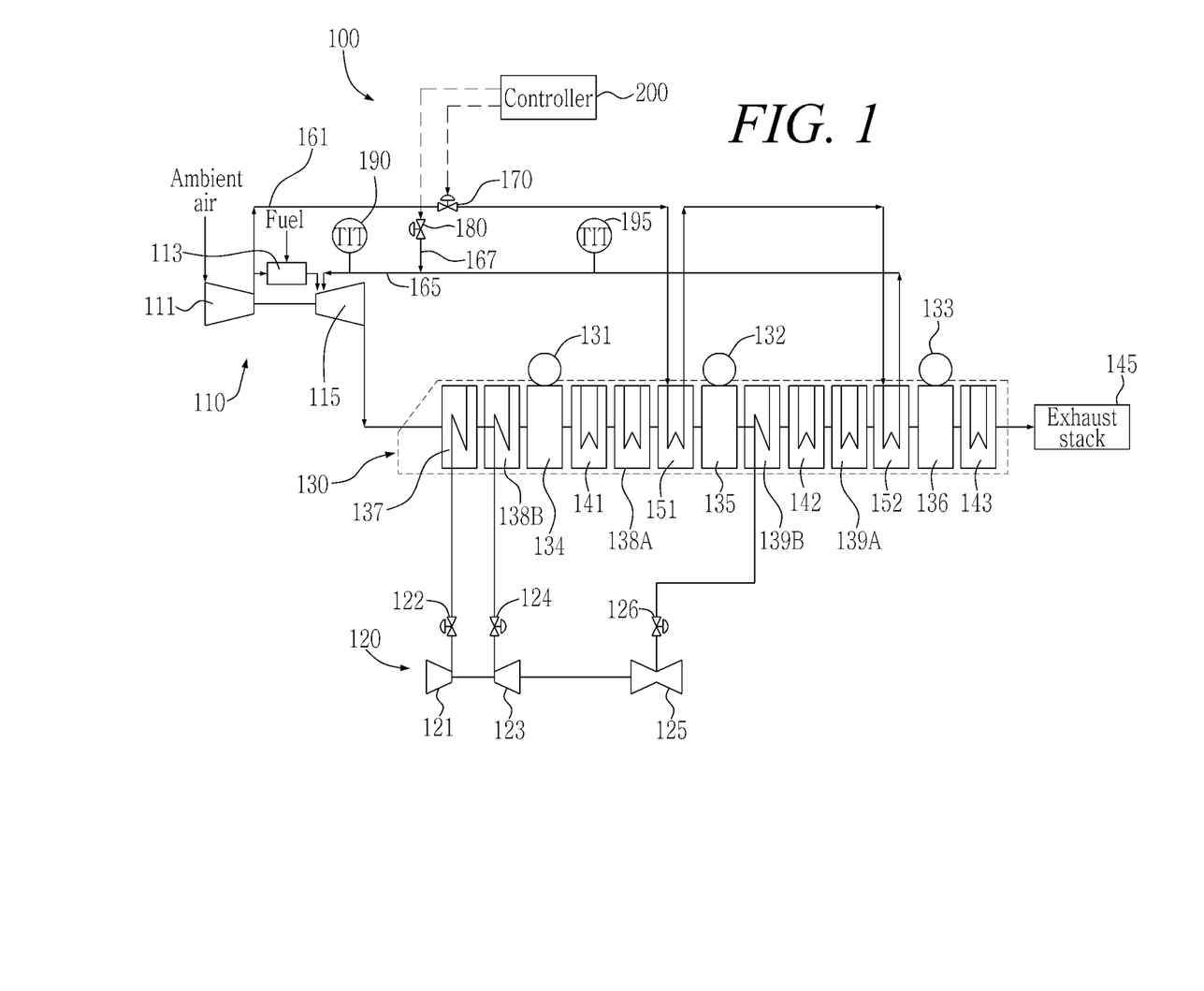
FIG. 1 is a diagram illustrating a combined power generation system according to an embodiment of the present disclosure.

FIG. 1 is a block diagram illustrating a combined power generation system according to an embodiment of the present disclosure.

The combined power generation system 100 of the present disclosure includes: a gas turbine 110 including a compressor 111 that compresses air, a combustor 113 that combusts a mixture of the compressed air compressed by the compressor and fuel, and a turbine section that obtains rotational power by the combustion gases generated by the combustor; a heat recovery steam generator (HRSG) 130 in which steam is generated by heat of exhaust gases from the gas turbine; and a steam turbine 120 driven by the steam generated by the HRSG.

The compressor 111 sucks and compresses ambient air. The compressor 111 is connected to the turbine section 115 by a rotary shaft so that the compressor can rotate with the rotation of the turbine section 115. The compressor 111 has a plurality of blades and vanes in multiple stages to compress the incoming air.

The combustor 113 may combust a mixture of fuel and compressed air compressed by the compressor 111. The fuel may be a gaseous fuel such as natural gas or petroleum gas.

The rotary shaft of the turbine section 115 may be rotated by the combustion gases generated by the combustor 113. The turbine section 115 has the plurality of blades and vanes arranged in multiple stages so that the rotary shaft is rotated by the combustion gases.

The HRSG 130 may also be referred to as a heat recovery boiler. The HRSG 130 may recover heat from the high-temperature exhaust gases from the gas turbine. This heat is utilized to heat water, ultimately resulting in generation of steam. The generated steam can be piped to drive the steam turbine 120.

A central rotary shaft of the steam turbine 120 may be rotated by the steam generated in the HRSG 130. The steam turbine 120 may include a high-pressure turbine section 121, a medium-pressure turbine section 123, and a low-pressure turbine section 125, with a rotary shaft connected therebetween. The high-pressure turbine section 121, the medium-pressure turbine section 123, and the low-pressure turbine section 125 may be supplied with high-pressure steam, medium-pressure steam, and low-pressure steam, respectively, from the steam generated by the HRSG 130.

The HRSG 130 may generate steam using exhaust gases from the steam turbine 120. The HRSG 130 may have a plurality of superheaters, economizers, reheaters, and evaporators sequentially arranged according to steam pressure to heat exchange with the exhaust gases. The HRSG 130 according to the present disclosure may include a plurality of heat exchangers 151, 152 to cool the compressed air by performing a heat exchange process between a portion of the compressed air from the compressor 111 and the exhaust gases from the turbine section 115. In a normal state operation of the gas turbine 110, the temperature of the exhaust gases remains lower than the temperature of the compressed air. This temperature difference allows the exhaust gases to serve as cooling fluid for lowering the temperature of the compressed air. This cooling action may facilitate to maintain the optimal operating temperature of the internal components within the turbine section 115.

The HRSG 130 sequentially includes a high-pressure superheater 137, a second medium-pressure superheater 138B, a high-pressure evaporator 134 disposed below a high-pressure drum 131, a high-pressure economizer 141, a first medium-pressure superheater 138A, and a medium-pressure evaporator 135 disposed below a medium-pressure drum 132, a second low-pressure superheater 139B, a medium-pressure economizer 142, a first low-pressure superheater 139A, a low-pressure evaporator 136 disposed below a low-pressure drum 133, and a low-pressure economizer 143, according to a flow direction of the exhaust gas.

The superheaters 137, 138A, 138B, 139A, 139B may heat the saturated steam generated in the drums 131, 132, 133, to generate superheated steam with a higher temperature. The superheated steam generated by the high-pressure superheater 137 may be supplied to the high-pressure turbine section 121. A high-pressure valve 122 may be installed in a high-pressure superheated steam flow path between the high-pressure superheater 137 and the high-pressure turbine section 121 to regulate a flow rate of superheated steam.

The superheated steam generated by the first medium-pressure superheater 138A and the second medium-pressure superheater 138B may be supplied to the medium-pressure turbine section 123. A medium-pressure valve 124 may be installed in a medium-pressure superheated steam flow path between the first/second medium-pressure superheater 138A, 138B and the medium-pressure turbine section 123 to regulate a flow rate of superheated steam.

According to an embodiment, the first medium-pressure superheater 138A may be configured as a reheater. The reheater may reheat the steam that has dropped in temperature after working in the high-pressure turbine section 121 to increase the superheat degree.

The superheated steam generated by the first low-pressure superheater 139A and the second low-pressure superheater 139B may be supplied to the low-pressure turbine section 125. A low-pressure valve 126 may be installed in a low-pressure superheated steam flow path between the first/second low-pressure super heater 139A, 139B and the low-pressure turbine section 125 to regulate a flow rate of superheated steam.

The evaporator evaporates water supplied to the HRSG 130 to generate steam. The high-pressure evaporator 134 may be disposed below the high-pressure drum 131, the medium-pressure evaporator 135 may be disposed below the medium-pressure drum 132, and the low-pressure evaporator 136 may be disposed below the low-pressure drum 133. The feedwater may flow sequentially through the low-pressure evaporator 136, the medium-pressure evaporator 135, and the high-pressure evaporator 134, in which the feedwater is evaporated by the exhaust gases to generate steam.

The economizers, 141, 142, 143, also known as a feedwater preheater, use heat from the exhaust gases to raise the feedwater temperature to recover lost heat, increase boiler efficiency, and save fuel.

When upstream/downstream directions are defined based on the flow direction of the exhaust gas, the high-pressure economizer 141 may be disposed downstream of the high-pressure evaporator 134 to preheat the feedwater. The medium-pressure economizer 142 may be disposed downstream of the medium-pressure evaporator 135 to preheat the feedwater. The low-pressure economizer 143 may be disposed downstream of the low-pressure evaporator 136 to preheat the feedwater.

The exhaust gases may enter the HRSG 130 and pass from the high-pressure superheater 137 to the low-pressure economizer 143 for heat exchange before being discharged to an exhaust stack 145.

The HRSG 130 may further include a medium-pressure heat exchanger 151 and a low-pressure heat exchanger 152.

The medium-pressure heat exchanger 151 may be disposed upstream of the medium-pressure evaporator 135 and cools the compressed air by heat exchange between the compressed air and the exhaust gas. The low-pressure heat exchanger may be disposed upstream of the low-pressure evaporator 136 to re-cool the compressed air that has been cooled by the medium-pressure heat exchanger 151.

The medium-pressure heat exchanger 151 may be disposed nearby the upstream side of the medium-pressure evaporator 135 to perform heat exchange between the compressed air and the exhaust gases to cool the compressed air. Specifically, the medium-pressure heat exchanger 151 may be disposed between the first medium-pressure superheater 138A and the medium-pressure evaporator 135.

The low-pressure heat exchanger 152 may be disposed nearby the upstream side of the low-pressure evaporator 136 to perform heat exchange between the compressed air and the exhaust gases to further cool the compressed air. Specifically, the low-pressure heat exchanger 152 may be disposed between the first low-pressure superheater 139A and the low-pressure evaporator 136.

The combined power generation system 100 may further include a compressed air flow path 161 connecting, and flowing (i.e., delivering) the compressed air, from the compressor 111 to the plurality of heat exchangers 151, 152, a cooling air flow path 165 connecting, and flowing (i.e., delivering) the cooled compressed air, from the plurality of heat exchangers 151, 152 to the turbine section 115. The combined power generation system may further include a bypass flow path 167 connecting, flow (i.e., delivering) the compressed air from the compressed air flow path to the cooling air flow path.

According to an embodiment, the compressed air flow path 161 may branch off from a flow path from the compressor 111 to the combustor 113 (the "compressor-combustor path") and connect to the medium-pressure heat exchanger 151, and connect from the medium-pressure heat exchanger 151 to the low-pressure heat exchanger 152. In other words, an upstream part of the compressed air flow path 161 may be disposed between and connecting the compressor-combustor path and the medium-pressure heat exchanger 151 and a downstream part of the compressed air flow path 161 may be disposed between and connecting the medium-pressure heat changer 151 and the low-pressure heat exchanger 152.

The cooling air flow path 165 may connect from the low-pressure heat exchanger to a cooling air inlet of the turbine section 115.

According to an embodiment, the bypass flow path 167 may connect from an upstream midpoint of the compressed air flow path 161 to a downstream midpoint of the cooling air flow path 165. The downstream midpoint of the cooling air flow path 165 where the bypass flow path 167 joins may be referred to as a bypass flow joint point. Accordingly, the portion of the compressed air introduced into the compressed air flow path 161 may flow through the bypass flow path 167 directly into the turbine section 115 without flowing through the plurality of heat exchangers 151 and 152.

According to an embodiment a main valve 170 may be installed in the compressed air flow path 161 to regulate the air flow rate in the compressed air flow path 161. In addition, a bypass valve 180 may be installed in the bypass flow path 167 to regulate the air flow rate in the bypass flow path 167.

The combined power generation system 100 of the present disclosure may further include a plurality of temperature sensors including temperature sensors 190, 195 installed in the cooling air flow path 165 to measure the temperature of the cooling air (i.e., "the cooled compressed air" throughout the specification) entering the turbine section 115.

The first temperature sensor 190 may be installed near the cooling air inlet of the turbine section 115 in the cooling air flow path 165 between the cooling air inlet of the turbine section 115 and the bypass flow joint point. The second temperature sensor 195 may be installed in the cooling air flow path 165 at a point before the bypass flow joint point (i.e., at a point upstream than the bypass flow joint point based on the flow direction of the cooled compressed air).

The first temperature sensor 190 may measure the temperature of the cooling air within the cooling air flow path 165 immediately before the cooling air enters the turbine section 115. Thus, the first temperature sensor 190 may measure the temperature of a mixture of two airs: the cooled compressed air that has been cooled by passing through the plurality of heat exchangers 151 and 152 and the compressed air that has flowed through the bypass flow path 167.

The second temperature sensor 195 may be installed in the middle of the cooling air flow path 165 before the cooling air flow path meets the bypass flow path 167. The second temperature sensor 195 may measure the temperature of the cooling air (i.e., the cooled compressed air) that has been cooled through flowing through the plurality of heat exchangers 151 and 152.

The combined power generation system 100 of the present disclosure may further include a controller 200 that regulates the opening degree of the main valve 170 and the bypass valve 180.

Figure 2:
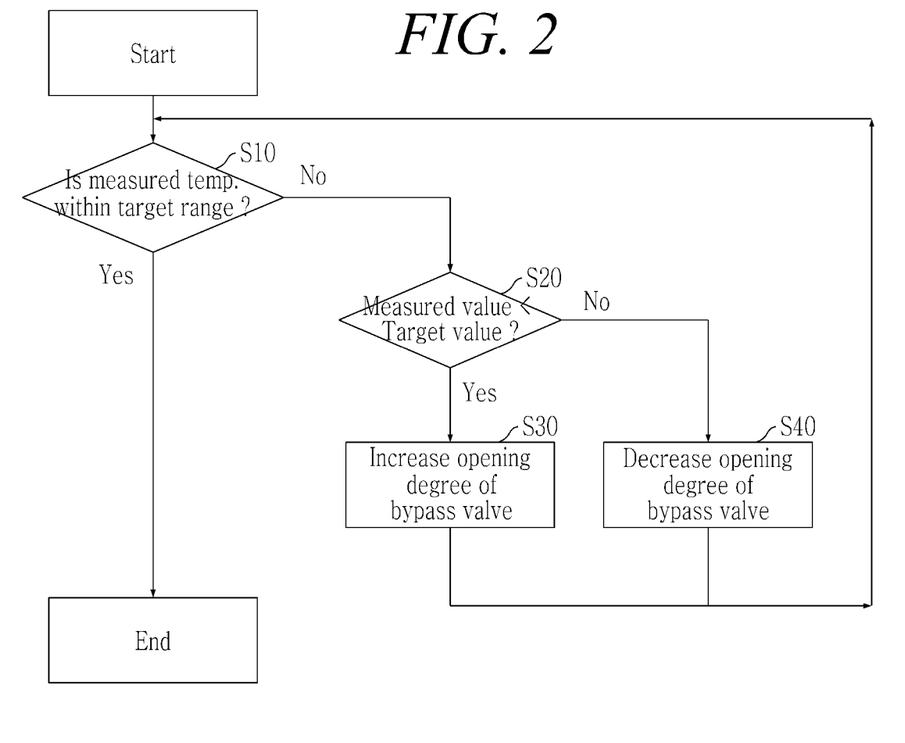
FIG. 2 is a flowchart illustrating an operation control method of the combined power generation system according to an embodiment of the present disclosure.

As illustrated in FIG. 2, the controller 200 may be configured to increase the opening degree of the bypass valve 180 when the measured temperature of the cooling air from the temperature sensor 190 is lower than a target value, and to decrease the opening degree of the bypass valve 180 when the measured temperature of the cooling air from the temperature sensor 190 is higher than the target value.

The controller 200 may receive a temperature measurement signal of the cooling air from the first temperature sensor 190 to control the main valve 170 and the bypass valve 180 depending on the temperature of the cooling air.

First, the controller determines whether the measured temperature of the cooling air is within a target range, i.e., a set temperature range (S10). When the measured temperature of the cooling air is within the target range, the controller 200 may keep the opening degree of the main valve 170 and the bypass valve 180 unchanged.

When the measured temperature of the cooling air is out of the target range, the controller 200 determines whether the measured temperature is lower than the target range (S20).

When the measured temperature is lower than the target value, the controller may increase the opening degree of the bypass valve 180 (S30) to allow more of the compressed air to flow through the bypass flow path 167 without passing through the plurality of heat exchangers 151 and 152, thereby further increasing the temperature of the cooling air.

Conversely, when the measured temperature is higher than the target value, the controller may decrease the opening degree of the bypass valve 180 (S40) to allow more of the compressed air to pass through the plurality of heat exchangers 151 and 152, thereby further lowering the temperature of the cooling air.

Figure 3:
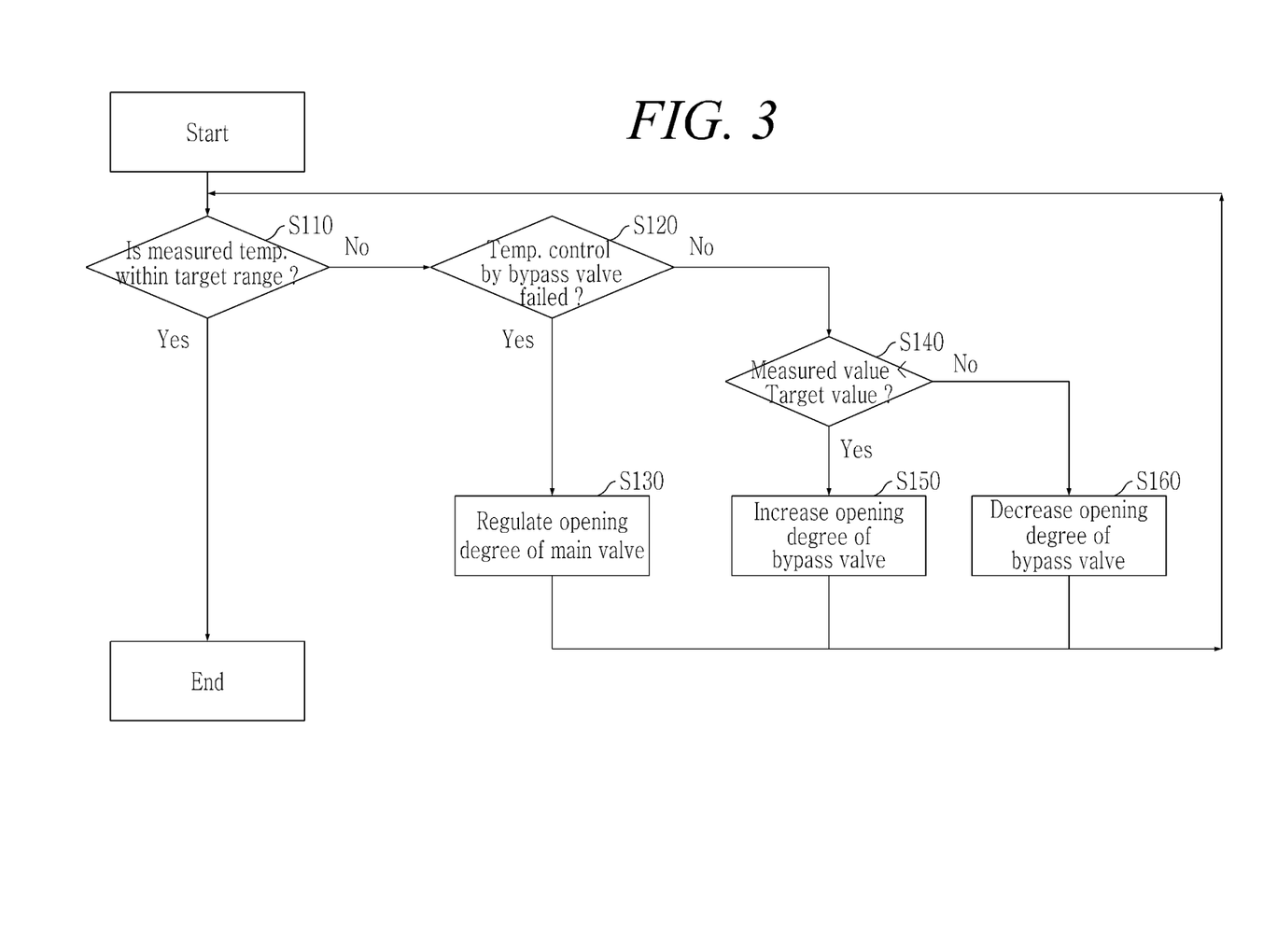
FIG. 3 is a flowchart illustrating an operation control method of the combined power generation system according to another embodiment of the present disclosure.

FIG. 3 is a flowchart illustrating a method of controlling an operation of the combined power generation system according to another embodiment of the present disclosure.

The controller 200 may be configured to controls the temperature of the cooling air by regulating the opening degree of the main valve 170 when it is determined that the temperature control by the bypass valve 180 fails (i.e., being not operable), and controls the temperature of the cooling air by regulating the opening degree of the bypass valve 180 when it is determined that the temperature control by the bypass valve 180 is operable.

Specifically, first, the controller 200 may determine whether the measured temperature of the cooling air from the temperature sensor 190 is within a target range, i.e., a set temperature range (S110). When the measured temperature of the cooling air by the temperature sensor 190 is within the target range, the controller 200 may keep the opening degree of the main valve 170 and the bypass valve 180 unchanged.

When the measured temperature of the cooling air measured by the temperature sensor 190 is out of the target range, the controller determines whether the temperature control by the bypass valve 180 has failed (S120). When the temperature of the cooling air cannot be regulated by the bypass valve 180 due to a failure of the bypass valve 180 or the like, the controller 200 may attempt to regulate the temperature of the cooling air by adjusting the opening degree of the main valve 170 only (S130).

Next, when the temperature control by the bypass valve 180 has not failed, i.e., when the temperature control by the bypass valve 180 is possible, the controller determines whether the measured temperature of the cooling air is lower than the target range (S140).

When the measured temperature is lower than the target value, the controller may increase the opening degree of the bypass valve 180 (S150) to allow more of the compressed air to flow through the bypass flow path 167 without passing through the plurality of heat exchangers 151 and 152, thereby further increasing the temperature of the cooling air.

Conversely, when the measured temperature is higher than the target value, the controller may decrease the opening degree of the bypass valve 180 (S160) to allow more of the compressed air to pass through the plurality of heat exchangers 151 and 152, thereby further lowering the temperature of the cooling air.

Figure 4:
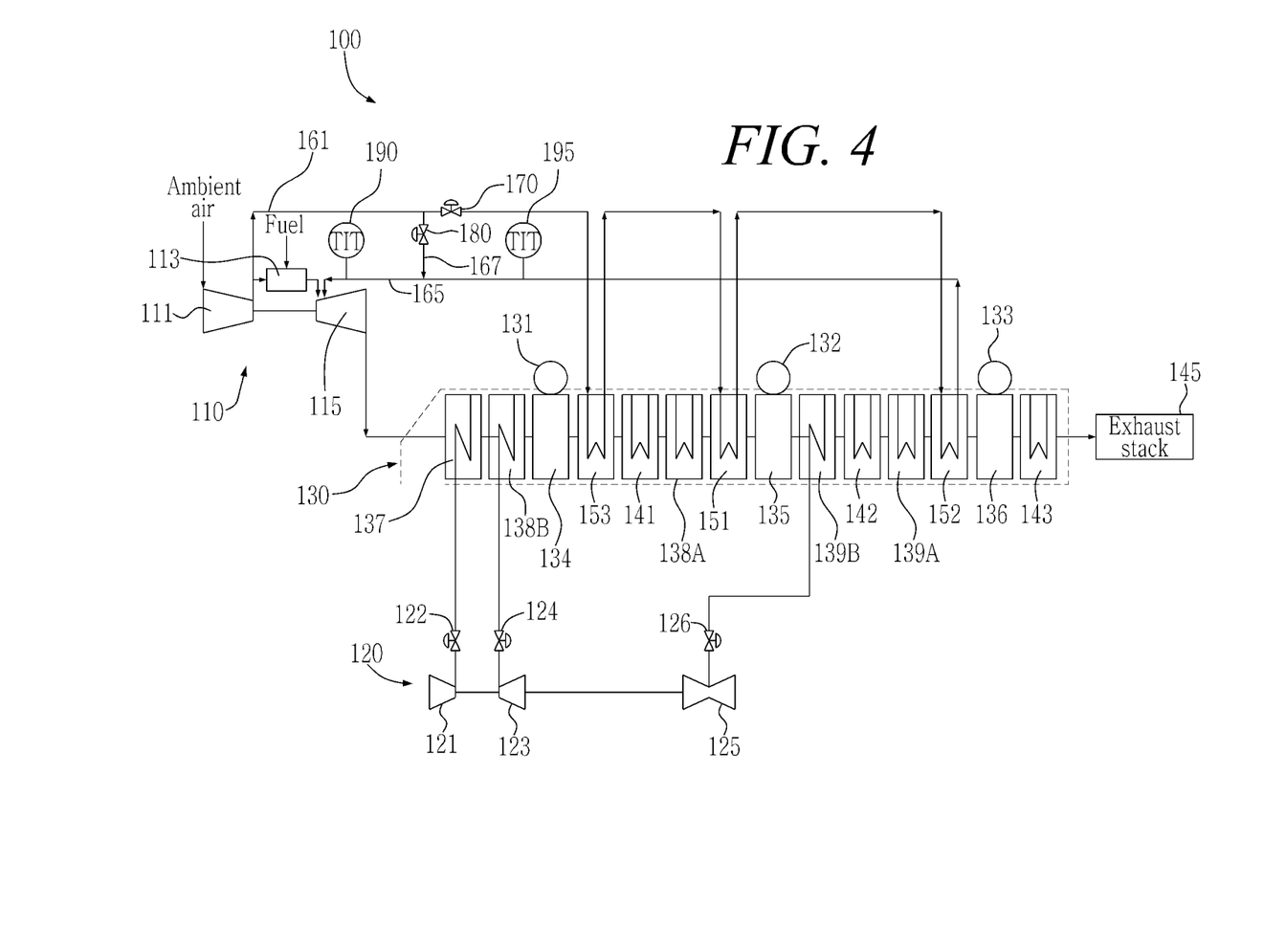
FIG. 4 is a diagram illustrating a combined power generation system according to another embodiment of the present disclosure.

FIG. 4 is a diagram illustrating a combined power generation system according to another embodiment of the present disclosure.

In this combined power generation system 100, the plurality of heat exchangers may further include a high-pressure heat exchanger 153 disposed downstream of the high-pressure evaporator 134.

The high-pressure heat exchanger 153 may be disposed between the high-pressure evaporator 134 and the high-pressure economizer 141 in the HRSG 130.

The compressed air flow path 161 may connect from the compressor 110 to the high-pressure heat exchanger 153, connect from the high-pressure heat exchanger 153 to the medium-pressure heat exchanger 151, and then connect from the medium-pressure heat exchanger 151 to the low-pressure heat exchanger 152. In other words, an upstream portion of the compressed air flow path 161 may be disposed between and connecting the compressor 110 and the high-pressure heat exchanger 153, a middle portion of the compressed air flow path 161 may be disposed between and connecting the high-pressure heat exchanger 153 and the medium-pressure heat exchanger 151, and a downstream portion of the compressed air flow path 161 may be disposed between and connecting the medium-pressure heat changer and the low-pressure heat exchanger 152.

The cooling air flow path 165 may connect from the low-pressure heat exchanger to the compressor 110, as in the embodiment described above. In addition, the bypass flow path 167 may connect from the middle of the compressed air flow path 161 to the middle of the cooling air flow path 165.

According to this embodiment, the combined power generation system 130 may be further equipped with an additional heat exchanger to perform heat exchange between the compressed air and the exhaust gases to further cool the compressed air using the exhaust gases.

Since the operation control method of the combined power generation system 100 of the present embodiment is as described in the above embodiment, a redundant description will be omitted.

According to the combined power generation system and the operation control method thereof, the plurality of heat exchangers is provided inside the HRSG so that exhaust gases are additionally utilized as a cooling source to cool the compressed air, thereby shortening startup time. Furthermore, no separate construction site is necessary for the cooling system to cool the compressed air.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A combined power generation system comprising:
    a gas turbine including a compressor configured to compress air, a combustor configured to combust a mixture of the compressed air and fuel and generate combustion gases, and a turbine section configured to rotate a turbine with the combustion gases and discharge exhaust gases;
    a heat recovery steam generator (HRSG) in which steam is generated by heat of the exhaust gases from the gas turbine; and
    a steam turbine driven by the steam generated by the HRSG,
    wherein the HRSG includes a plurality of heat exchangers, located within a flow path of the exhaust gases in which the exhaust gases flow, provided to cool the compressed air by performing heat exchange between the compressed air and the exhaust gases within the flow path of the exhaust gases.

2. The combined power generation system of claim 1, the plurality of heat exchangers supplies cooled compressed air to the turbine section.

3. The combined power generation system of claim 2, wherein the plurality of heat exchangers comprises:
    a high-pressure heat exchanger disposed downstream of a high-pressure evaporator,
    a medium-pressure heat exchanger disposed upstream of a medium-pressure evaporator to re-cool the compressed air that has been cooled by the high-pressure heat exchanger, and
    a low-pressure heat exchanger disposed upstream of a low-pressure evaporator to re-cool the compressed air that has been cooled by the medium-pressure heat exchanger.

4. The combined power generation system of claim 3, further comprising:
    a compressed air flow path from the compressor to the plurality of heat exchangers;
    a cooling air flow path from the plurality of heat exchangers to the turbine section;
    a bypass flow path from the compressed air flow path to the cooling air flow path;
    a main valve installed in the compressed air flow path; and
    a bypass valve installed in the bypass flow path.

5. The combined power generation system of claim 4, further comprising:
    a plurality of temperature sensors installed in the cooling air flow path to measure the temperature of the cooled compressed air entering the turbine section.

6. The combined power generation system of claim 4, wherein the HRSG sequentially comprises, along a flow direction of the exhaust gases:
    a high-pressure superheater;
    a second medium-pressure superheater;
    a high-pressure evaporator;
    a high-pressure economizer;
    a first medium-pressure superheater;
    a medium-pressure evaporator;
    a second low-pressure superheater, a medium-pressure economizer;
    a medium-pressure economizer;
    a first low-pressure superheater;
    a low-pressure evaporator; and
    a low-pressure economizer,
    wherein the high-pressure heat exchanger is disposed between the high-pressure evaporator and the high-pressure economizer, the medium-pressure heat exchanger is disposed between the first medium-pressure superheater and the medium-pressure evaporator, and the low-pressure heat exchanger is disposed between the first low-pressure superheater and the low-pressure evaporator along the flow direction of the exhaust gases.

7. The combined power generation system of claim 2, wherein the plurality of heat exchangers comprises:
    a medium-pressure heat exchanger disposed upstream of a medium-pressure evaporator; and
    a low-pressure heat exchanger disposed upstream of a low-pressure evaporator to re-cool the compressed air that has been cooled by the medium-pressure heat exchanger.

8. The combined power generation system of claim 7, wherein the HRSG sequentially comprises, along a flow direction of the exhaust gases:
    a high-pressure superheater;
    a second medium-pressure superheater;
    a high-pressure evaporator;
    a high-pressure economizer;
    a first medium-pressure superheater;
    a medium-pressure evaporator;
    a second low-pressure superheater;
    a medium-pressure economizer;
    a first low-pressure superheater;
    a low-pressure evaporator; and
    a low-pressure economizer,
    wherein the medium-pressure heat exchanger is disposed between the first medium-pressure superheater and the medium-pressure evaporator, and the low-pressure heat exchanger is disposed between the first low-pressure superheater and the low-pressure evaporator along the flow direction of the exhaust gases.

9. The combined power generation system of claim 7, further comprising:
a compressed air flow path that flows the compressed air from the compressor to the plurality of heat exchangers;
a cooling air flow path that flows the cooled compressed air from the plurality of heat exchangers to the turbine section;
a bypass flow path that flows the compressed air from the compressed air flow path to the cooling air flow path;
a main valve installed in the compressed air flow path; and
a bypass valve installed in the bypass flow path.

10. The combined power generation system of claim 9, further comprising: a plurality of temperature sensors installed in the cooling air flow path to measure the temperature of the cooled compressed air entering the turbine section.

11. The combined power generation system of claim 10, wherein the plurality of temperature sensors comprises:
a first temperature sensor installed near an inlet of the turbine section in the cooling air flow path; and
a second temperature sensor installed at a point in the cooling air flow path before the cooling air flow path is joined by the bypass flow path.

12. The combined power generation system of claim 10, further comprising:
a controller configured to regulate an opening degree of the main valve and the bypass valve,
wherein the controller is configured to increase the opening degree of the bypass valve when the measured temperature of the cooled compressed air by the temperature sensor is lower than a target value, and decrease the opening degree of the bypass valve when the measured temperature of the cooled compressed air by the temperature sensor is higher than the target value.

13. The combined power generation system of claim 10, further comprising:
a controller configured to regulate opening degrees of the main valve and the bypass valve,
wherein the controller is configured to regulate the opening degree of the main valve when the temperature control by the bypass valve is determined to have failed, and when the temperature control by the bypass valve is determined to not have failed, increase the opening degree of the bypass valve when the measured temperature of the cooled compressed air by the temperature sensor is lower than the target value, and decrease the opening degree of the bypass valve when the measured temperature of the cooled compressed air by the temperature sensor is higher than the target value.

14. A method of controlling an operation of a combined power generation system comprising: a gas turbine comprising a compressor configured to compress air, a combustor configured to combust a mixture of the compressed air and fuel and generate combustion gases, and a turbine section configured to rotate a turbine with the combustion gases and discharge exhaust gases; a heat recovery steam generator (HRSG) in which steam is generated by heat of the exhaust gases from the gas turbine; a steam turbine driven by the steam generated by the HRSG; and a plurality of heat exchangers provided in the HRSG, located within a flow path of the exhaust gases in which the exhaust gases flow, to cool the compressed air by performing heat exchange between the compressed air and the exhaust gases and supply cooled compressed air, the method comprising:
determining whether the temperature measured by a temperature sensor installed in a cooling air flow path connecting, and flowing the cooled compressed air, from the heat exchangers to the turbine section is within a target range;
when the measured temperature is not within the target range and is lower than a target value, increasing an opening degree of a bypass valve installed in a bypass flow path connecting, and flowing the compressed air, from a compressed air flow path to the cooling air flow path;
when the measured temperature is not within the target range and is higher than the target value, decreasing the opening degree of the bypass valve; and
when the measured temperature is within the target range, completing the adjustment of the opening degree of the bypass valve.

15. The method of claim 14,
wherein the compressed air flow path connects, and flows the compressed air, from the compressor to the plurality of heat exchangers,
wherein the cooling air flow path connects, and flows the cooled compressed air, from the heat exchangers to the turbine section.

16. The method of claim 15, wherein the plurality of heat exchangers comprises:
a medium-pressure heat exchanger disposed upstream of a medium-pressure evaporator; and
a low-pressure heat exchanger disposed upstream of a low-pressure evaporator to re-cool the compressed air that has been cooled by the medium-pressure heat exchanger.

17. The method of claim 16, wherein the plurality of heat exchangers further comprises a high-pressure heat exchanger disposed downstream of a high-pressure evaporator.

18. A method of controlling an operation of a combined power generation system comprising: a gas turbine comprising a compressor configured to compress air, a combustor configured to combust a mixture of the compressed air and fuel and generate combustion gases, and a turbine section configured to rotate a turbine with the combustion gases and discharge exhaust gases; a heat recovery steam generator (HRSG) in which steam is generated by heat of the exhaust gases from the gas turbine; a steam turbine driven by the steam generated by the HRSG; and a plurality of heat exchangers provided in the HRSG, located within a flow path of the exhaust gases in which the exhaust gases flow, to cool the compressed air by performing heat exchange between the compressed air and the exhaust gases and supply cooled compressed air, the method comprising:
determining whether the temperature measured by a temperature sensor installed in a cooling air flow path connecting, and flowing the cooled compressed air, from the heat exchangers to the turbine section is within a target range;
determining whether temperature control by a bypass valve installed in a bypass flow path connecting, and flowing the compressed air, from a compressed air flow path to the cooling air flow path has failed, the compressed air flow path connecting, and flowing the compressed air, from the compressor to the plurality of heat exchangers;
when the temperature control by the bypass valve is determined to have failed, adjusting an opening degree of a main valve installed in the compressed air flow path;

when the temperature control by the bypass valve is determined to not have failed, determining whether the measured temperature is lower than a target value;

when the measured temperature is lower than the target value, increasing an opening degree of the bypass valve installed in the bypass flow path;

when the measured temperature is higher than the target value, decreasing the opening degree of the bypass valve; and when the measured temperature is within the target range, completing the adjustment of the opening degree of the bypass valve.

19. The method of claim 18, wherein the plurality of heat exchangers comprises:

a medium-pressure heat exchanger disposed upstream of a medium-pressure evaporator; and a low-pressure heat exchanger disposed upstream of a low-pressure evaporator to re-cool the compressed air having been cooled by the medium-pressure heat exchanger.

20. The method of claim 19, wherein the plurality of heat exchangers further comprises a high-pressure heat exchanger disposed downstream of a high-pressure evaporator.

\* \* \* \* \*